Feb. 7, 1961     E. J. DIEBOLD     2,971,148
COMPOUNDING CIRCUIT FOR RECTIFIERS
Filed Feb. 21, 1957     3 Sheets-Sheet 1

INVENTOR.
EDWARD JOHN DIEBOLD

BY *Ostrolenk, Faber,*
*Gerb & Soffen*

ATTORNEYS

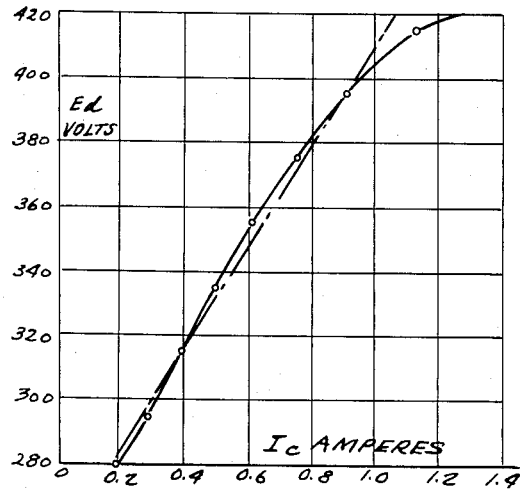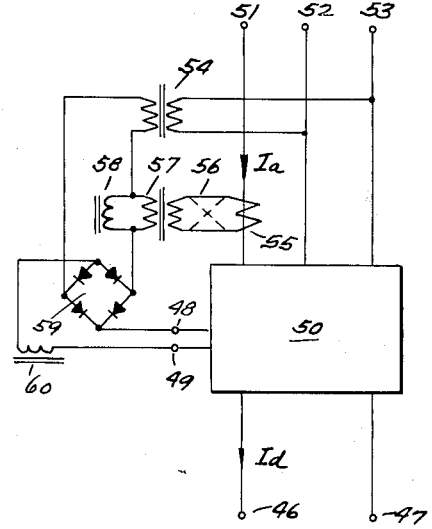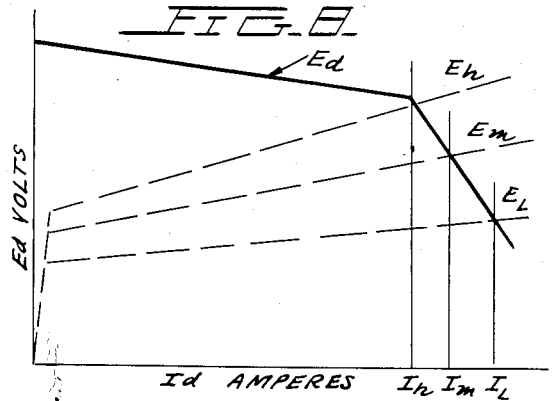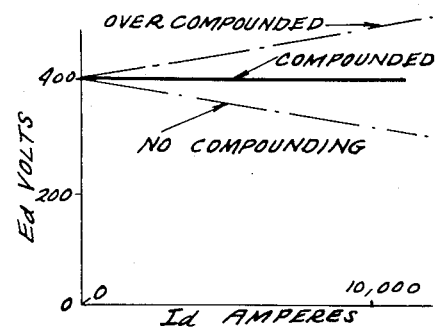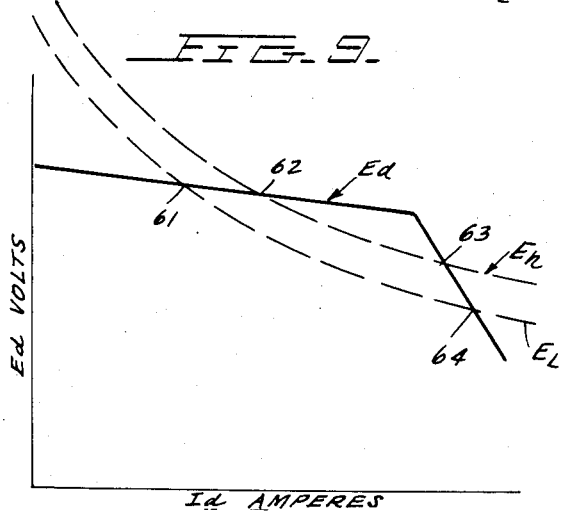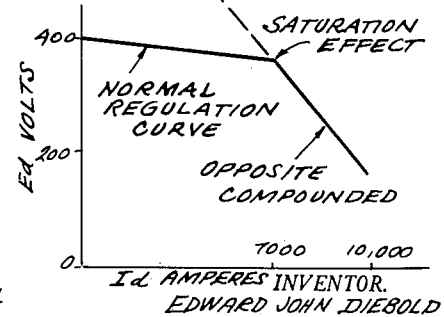
INVENTOR.
EDWARD JOHN DIEBOLD
ATTORNEYS Feb. 7, 1961 E. J. DIEBOLD 2,971,148
COMPOUNDING CIRCUIT FOR RECTIFIERS
Filed Feb. 21, 1957 3 Sheets-Sheet 3

INVENTOR.
EDWARD JOHN DIEBOLD
BY Ostrolenk, Faber,
Gerb & Soffen
ATTORNEYS

United States Patent Office 2,971,148
Patented Feb. 7, 1961

2,971,148
COMPOUNDING CIRCUIT FOR RECTIFIERS

Edward John Diebold, Palos Verdes Estates, Calif., assignor to I-T-E Circuit Breaker Company, Philadelphia, Pa., a corporation of Pennsylvania Filed Feb. 21, 1957, Ser. No. 641,712

3 Claims. (Cl. 321—25)

My invention relates to a compounding circuit for rectifiers and more specifically relates to a circuit for controlling the regulation characteristic of rectifier devices which obtain voltage regulation by saturable reactor control means of the type set forth in my copending U.S. Patent No. 2,817,805 issued December 24, 1957 entitled Flux Reversal Circuit for Commutating Reactors of Mechanical Rectifiers, and Serial No. 544,507 filed November 2, 1955 entitled Flux Reversal Circuits for Mechanical Rectifiers to Michael Belamin and now Patent No. 2,854,616.

As set forth in the above noted applications, a saturable reactor is connected in series with each phase of a rectifier. A flux reversal circuit is connected to a control winding of each reactor and controls the point of saturation of the reactor during the forward conduction period of the phase associated with this reactor. Hence, by varying the energization of the flux reversal circuit, the point at which the reactor saturates and the forward A.-C. voltage is impressed across the load is easily controlled to give a magnetic amplifier type control of the output load voltage.

My copending U.S. Patent No. 2,817,805, issued December 24, 1957 shows how a constant voltage output or constant current output, or any desired voltage and current behavior can be obtained by means of an automatic regulator operating in conjunction with the flux reversal contact winding.

However, there are applications where the rectifier is not provided with an automatic regulator and has to supply a direct current of a certain amount in a D.-C. system with a certain resistance, under conditions of variable load or variable supply voltage. Such cases will occur in installations where no automatic regulator is needed and a certain output characteristic of the rectifier is required. One particular application will be for such loads which are inherently variable to such an extent and in such a short time that an automatic regulator cannot be made to follow fast enough to maintain the current or the voltage constant. Another important application is where a rectifier must operate on a system which is to unstable to permit the operation of an automatic regulator which would increase the instability of the system.

A further important application of my novel invention is to installations where two or more rectifiers are to be operated in parallel. It is important in this case that the regulation characteristics of the parallel connected rectifiers be closely matched to one another to avoid undesirable circulating currents between rectifiers which are mismatched in output voltage.

Thus, by providing the rectifiers with my novel compounding circuits, their regulation characteristics can be adjusted to match one another.

The primary object of my invention is to obtain a desired regulation characteristic, without the use of an automatic regulator and to obtain this automatic characteristic without the instabilities which are inherent to regulating circuits.

It is understood that all regulating circuits are feedback control servo-mechanisms and thus exhibit their properties, which depend very much on the response properties of the whole system, including an unknown supply circuit and an unknown load. However, my novel compounding circuits described hereinafter are not feedback control systems and therefore do not introduce the potentially unstable behavior of such systems.

The principle of my invention is to provide a flux reversal circuit energization which is functionally related to various rectifier parameters so that a particular control of the rectifier regulation characteristic is obtained.

By way of example, the flux reversal energization can be made proportional to the rectifier input current. Thus, when the output current increases to cause a normal drop in output voltage due to regulation, the increased flux reversal energization will produce a compensating increase in output voltage so that a constant voltage is obtained for any output current.

By increasing the proportionality factor, the rectifier may be over-compounded to give a raising regulation characteristic.

Similarly, by making flux reversal energization inversely proportional to load current, the rectifier may be oppositely compounded to achieve a rapidly dropping regulation characteristic.

As a further example, the flux reversal energization can be made inversely proportional to input voltage whereby an increase in input voltage will be compensated for by a decreasing output voltage due to the increased flux reversal, and a constant output voltage is obtained for any input voltage.

Accordingly, a primary object of my invention is to provide novel means for controlling the regulation characteristic of rectifiers utilizing magnetic voltage control.

Another object of my invention is to provide a novel rectifier compounding means utilizing the control of the flux reversal circuit responsive to either voltage or current conditions, or both, of the rectifier.

A still further object of my invention is to vary the flux reversal energization of the voltage control reactors of a rectifier responsive to either voltage or current conditions, or both, of the rectifier to thereby control the regulation characteristic of the rectifier.

Another object of my invention is to provide a novel compounding circuit to the rectifiers of a plurality of rectifiers wherein the flux reversal circuits of the rectifiers are controlled to cause matching of the regulation characteristics of the rectifiers.

Still another object of my invention is to provide a compounding circuit for a rectifier which is inexpensive and simple in operation.

A further object of my invention is to provide a novel compounding circuit for rectifiers which operate in unstable systems which prevent satisfactory operation of automatic regulators.

These and other objects of my invention will become obvious from the following description when taken in conjunction with the drawings in which:

Figure 1 shows a mechanical rectifier which utilizes a flux reversal circuit for output voltage control.

Figure 2 schematically represents the circuit of Figure 1 wherein rectification is achieved by any desired rectifier device and voltage regulation is controlled by a small control current.

Figure 4 shows the control characteristic for the rectifier of Figure 1.

Figure 5 shows one embodiment of my novel compounding circuit when applied to the schematic circuit of Figure 2.

Figure 6 shows how the regulation characteristic of Figure 3 may be controlled by my novel compounding circuit.

Figure 7 shows the regulation characteristic of Figure 3 when the rectifier is opposite compounded by my novel compounding circuit.

Figure 8 shows how the opposite compounded rectifier characteristic of Figure 7 is used when the regulation curve of a load is that shown in dotted lines.

Figure 9 is similar to Figure 8 wherein the load characteristic, shown in dotted lines, has a negative characteristic.

Figure 1:
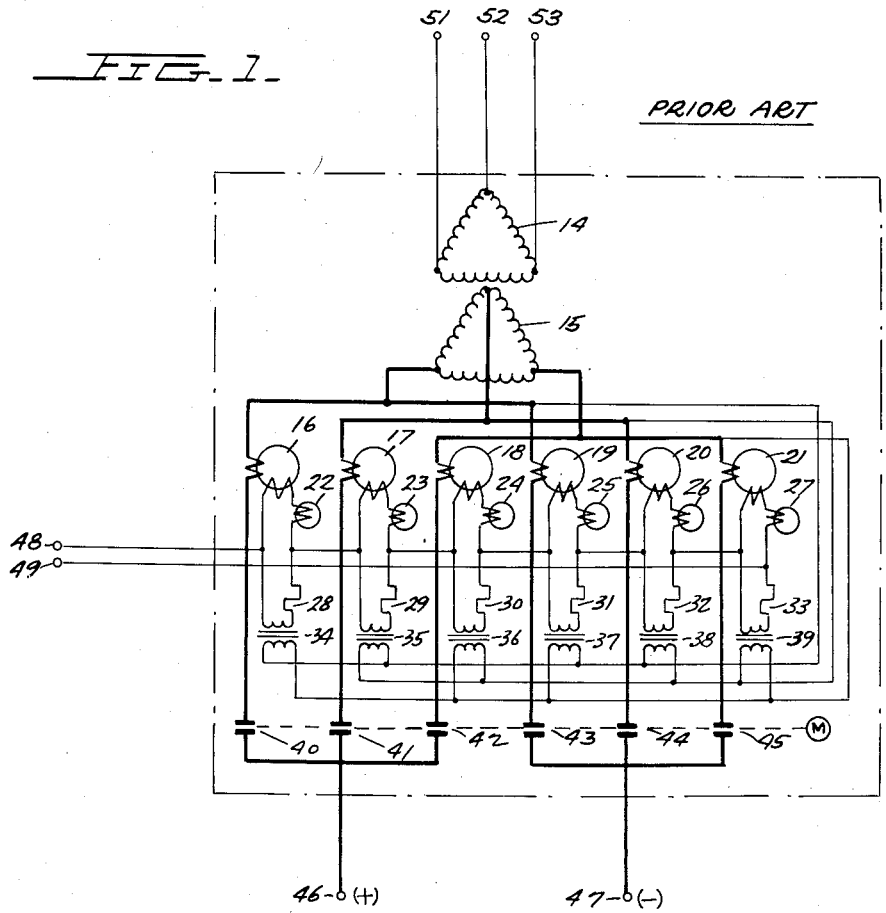

Figure 1 shows a mechanical rectifier utilizing flux reversal circuitry for control of the output voltage. This type of system is fully set forth in my copending U.S. Patent No. 2,817,805 issued December 24, 1957 which is herein made a part of the instant application.

The input terminals 51, 52, and 53 of Figure 1 are connectable to a three phase source of power and are connected to the primary winding 14 of the rectifier power transformer. The secondary winding 15 is then connected to the phases including commutating reactors 16, 17, 18, 19, 20 and 21 respectively, and contacts 40, 41, 42, 43, 44 and 45 respectively. The contacts are synchronously driven into and out of engagement as set forth in my U.S. Patent No. 2,759,141 issued August 14, 1956 entitled Regulator for Mechanical Rectifier while the commutating reactors provide protective low current steps within which the contacts may operate.

The three positive phases including contacts 40, 41 and 42 are then combined at positive output terminal 46 while the three negative phases including contacts 43, 44 and 45 are combined at negative output terminal 47.

In order to control the degree of saturation of the commutating reactors 16 through 21 prior to closure of their respective contact, each of the reactors are provided with a flux reversal circuit including auxiliary saturable reactors 22, 23, 24, 25, 26 and 27 respectively, resistors 28, 29, 30, 31, 32 and 33 respectively, and A.-C. sources 34, 35, 36, 37, 38 and 39 respectively.

A D.-C. control source is then connected at control terminals 48 and 49 to control the flux reversal of the commutating reactors 16 through 21 whereby variation of control current from terminals 48 and 49 controls the output voltage appearing at terminals 46 and 47. Since the operation of this circuit is the subject matter of my above noted U.S. Patent No. 2,817,805 issued December 24, 1957, it will not be further described herein. For purposes of the instant invention it is only important to understand that an increase in flux reversal current from terminals 48 and 49 will increase output voltage, while a decrease in input current will decrease output voltage. The rectifier, therefore, can be conceived as a generator of direct voltage, controlled by a small control current.

While the rectifier of Figure 1 is shown to be of the contact type, my invention is applicable to any type rectifier such as one utilizing metallic or semi-conductor units so long as magnetic control of the output voltage is utilized.

Figure 2:
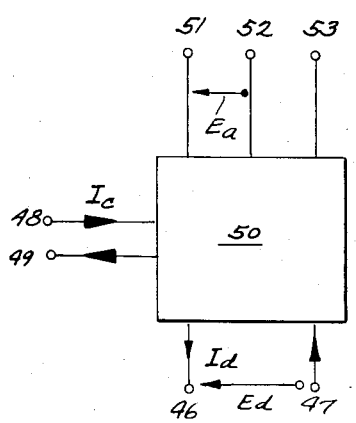

Thus, the rectifier circuit of Figure 1 can be simplified for purposes of describing the instant invention to the form shown in Figure 2 where box 50 denotes any rectifier device such as that contained within the dotted lines of Figure 1, and a small control current from terminals 48 and 49 controls the output voltage at terminals 46 and 47.

In Figure 2, the input A.-C. phase voltage $E_a$ is assumed to be a symmetric three phase voltage. The output voltage $E_d$ is a direct voltage produced by rectifier 50, and the output direct current is identified as $I_d$. A control current $I_c$ is applied to the rectifier from terminals 48 and 49.

Figure 3:
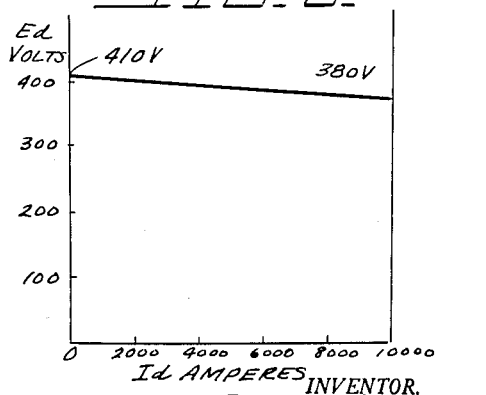
Figure 3 shows regulation curve for the rectifier device of Figure 1.

Two characteristics of the device of Figure 2 are now assumed; first, the natural regulation curve of Figure 3 and; second, the control characteristic of Figure 4, each of these curves carrying values typical of high power rectifier devices for purposes of illustration.

The regulation curve of Figure 3 is typically a straight line having a downward slope, having an output voltage of 410 volts at zero current and 380 volts at 10,000 amperes. As will be seen hereinafter, my novel compound circuit exercises control over this characteristic.

The control characteristic of Figure 4 is similar to the control characteristic of many magnetic amplifiers, and for most purposes can be replaced by the straight line characteristic shown in dotted lines.

One embodiment of my novel compounding circuit is set forth in Figure 5 as applied to the system of Figure 2, and comprises the current transformer 55 connected in the input conductor of the rectifier, the potential transformer 57 having its primary winding connected to current transformer 55 and its secondary winding connected across reactor 58, and potential transformer 54 having its primary winding connected to the rectifier phase voltage.

The polarity of voltages impressed across the primary windings of transformers 54 and 57 may be reversed with respect to one another by connecting the conductors from current transformer 55 to the primary winding of potential transformer 57 in the solid or dotted position, as will be described hereinafter.

The secondary voltages of transformers 54 and 57 are then added together and rectified by rectifier 59 and applied to terminals 48 and 49 through the smoothing choke 60.

The operation of circuit Figure 5 is as follows: A voltage which is approximately constant is produced in the secondary of transformer 54. The voltage which appears on the A.-C. choke 58 is added to this voltage, this additional voltage being proportional to the A.-C. current flowing through the current transformer 55. If the circuit at 56 is connected as shown by the solid lines, then the voltage added a reactor 58 increases the voltage generated by 54. If the rectifier is operating at an intermediate point on the curves of Figures 3 and 4, i.e. at a point of 400 volts and .95 amperes control current, then an increase in the load current $I_d$ will cause a proportional increase of the A.-C. current $I_a$. This current will generate a certain voltage on the current transformer 55 which is transformed to a higher level by transformer 57 and appears on the choke 58, thus increasing the voltage across the terminals 48 and 49 and hence the control current which, in turn, causes an increase of the direct voltage $E_d$.

By this means the regulation curve of Figure 3 can be changed as shown in Figure 6 from the dotted line of no compounding to the flat line of the compounded rectifier, of the dot-dash line of the raising regulation curve of the overcompounded mechanical rectifier.

The regulation curve of Figure 6 thus replaces the regulation curve of Figure 3 with the application of my novel invention, as shown in the circuit of Figure 5. A rectifier which is normally compounded to a flat output curve will, as seen in Figure 6, have the same output voltage no matter how much current is drawn. If it is overcompounded, the output voltage will raise with the current and thus compensate for the voltage drops in the D.-C. lines. The behavior thus becomes similar to the behavior of a compounded D.-C. generator.

If the mechanical rectifier is operated in parallel with other D.-C. generating equipment having a steeper regulation curve, then the compounding can be reversed by using the dotted line connection at 56 of Figure 5. The control current will then decrease with increasing load current $I_d$ and thus the voltage will decrease more rapidly than given by the natural regulation curve of the rectifier. By this means, it is possible to adapt the rectifier regulation curve to the regulation curve of other D.-C. equipment operating upon the same system.

If the opposite compounding is exaggerated, as shown in Figure 7, the control reactors of the mechanical rectifier saturate for the upper voltage range and the voltage of the rectifier cannot raise beyond a certain point. This is shown at the right-hand side of Figure 4 when the control current rises beyond 1.2 amperes. The saturation effect prevents a further increase of the output voltage whenever the control current gets too large, either for the overcompounded mechanical rectifier or for the opposite compounded mechanical rectifier.

For example, in Figure 7, the output current varies from zero to 7,000 amperes and the rectifier operates normally at its normal regulation curve because the control current in this range is higher than 1.2 amperes and too high to affect the magnetic voltage control at all. Beyond 7,000 amperes, the decrease of control current with increasing load current reaches and goes below the 1.2 ampere level, the machine becomes heavily opposite compounded, and its voltage drops rapidly from 400 to 200 volts in the narrow range between 7,000 and 10,000 amperes. It is thus possible to make a mechanical rectifier which has a fairly constant voltage output throughout most of the current range, and then a fairly constant current output during a substantial voltage range. This property of the opposite compounding, as shown in Figure 7, which is obtained from the circuit of Figure 5 simply by crossing the leads at 56 and increasing the voltage produced by the transformers 54 and 57 has many useful applications.

One such application is set forth in Figure 8 which shows in the solid line the regulation curve of the D.-C. voltage $E_d$ plotted against the D.-C. current $I_d$ of an opposite compounded mechanical rectifier with a saturating effect of the control current near the rated current. It is assumed to be operating on a heavy electrolytic load such as a chlorine cell line which would be connected across the rectifier output terminals 46—47 of Figure 5.

The regulation curves of the cell line are shown by the three dotted curves $E_h$, $E_m$, and $E_l$, these three regulation curves being the highest, medium and lowest values of the regulation curve of the cell line, depending on how many cells are used, and how high the temperature of the cell line is.

Curve $E_h$ would corresponding to a cell line with all the cells in and running at low temperature, i.e., during start-up. Curve $E_l$ corresponds to a cell line with many cells shorted out for repairs, and operating at a high temperature.

The points of crossing between the regulation curve of the rectifier and the regulation curve of the load is shown as the current $I_h$, $I_m$ and $I_l$, the respective load currents carried for the three different conditions.

It is easy to appreciate from Figure 8 that the variation of the load current is very much smaller than the variation of the load voltage. Therefore, my novel invention makes it possible to operate a rectifier at almost constant current without automatic voltage or current control. Another advantage of the operation as shown in Figure 8 is that sudden voltage dips of the load are taken care of automatically and instantaneously.

Figure 9 shows the rectifier of Figure 8 with the same regulation curve operating upon a load with negative characteristic (the two limiting curves $E_h$ and $E_l$ shown in dotted lines) which is, for example, an arc furnace. The electric arc, which is used in furnaces, has a drooping characteristic, since the voltage drop across the arc decreases as the current increases. If the arc furnace would operate at a current and voltage shown in Figure 9 by the point 61 or 62, an increase in current results in a smaller voltage drop across the arc and thus in an even greater increase of current. A decrease of current results in a higher voltage drop of the arc and thus in a smaller current. Operation at the point 61 and 62, therefore, would be completely unstable and the arc would either be short-circuited or out if the rectifier has the normal slightly sloping regulation characteristic.

If, however, the negative compounded characteristic is introduced, shown in Figure 9 as the steep drop at the higher current range, then an arc burning at a point which is at the right hand side of either 61 or 62 will result in an increased current, increasing until the regulation curve of the rectifier crosses the regulation curve of the arc at point 63 or at point 64. At these points an increase in the arc current will result in a lesser voltage of the rectifier than the arc voltage, thus resulting in a decrease of the arc current.

A sudden decrease of the arc current, on the other hand, will result in a higher voltage of the rectifier than the arc and thus result in an increase of the arc current again. Hence, the operation at point 63 and 64 will be stable. If the arc voltage jumps suddenly from the curve $E_h$ to the curve $E_l$ the operation is still stable and the load current has changed only negligibly. By means of the opposite compounding it is therefore possible, to obtain stable operation of a mechanical rectifier upon a load with drooping characteristic, like an arc furnace, and maintain the load current fairly constant.

Figure 10:
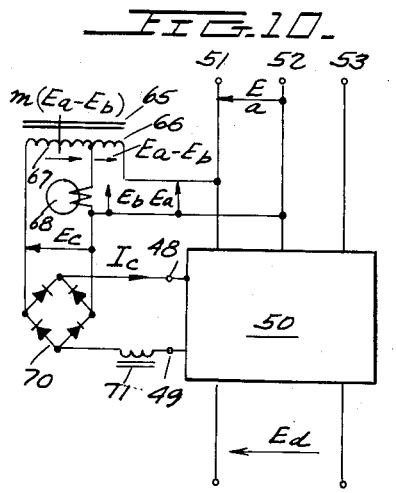
Figure 10 shows a second embodiment of my novel invention which provides a constant output voltage for the rectifier regardless of input voltage variations.

The compounding circuit described previously compensates for the voltage drop in the rectifier due to the variation of the load current. Another type of compounding is also possible to compensate for the variation of the supply voltage $E_a$. Figure 10 shows a compensating circuit which, in accordance with my novel invention, is used to compensate for the variation of the D.-C. voltage $E_d$ upon variation of the A.-C. voltage $E_a$.

Figure 11:
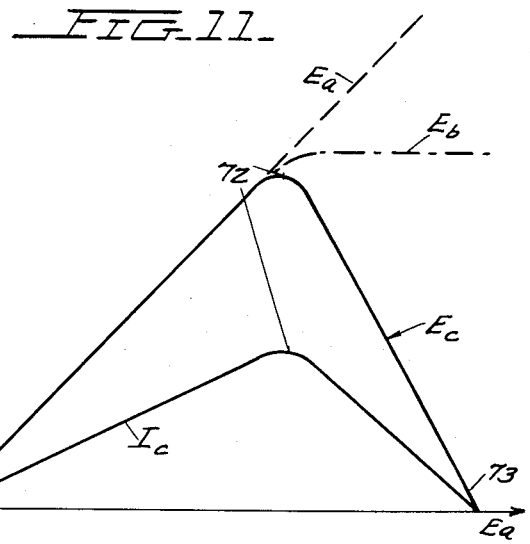
Figure 11 shows the control voltage and current conditions for the control circuit of Figure 10.
Figure 12:
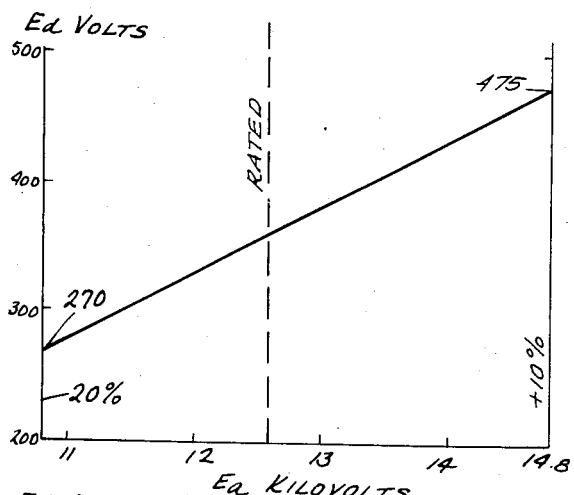
Figure 12 shows the variation of output voltage responsive to variation in input voltage for the circuit of Figure 1 in the absence of the control circuit of Figure 10.
Figure 13:
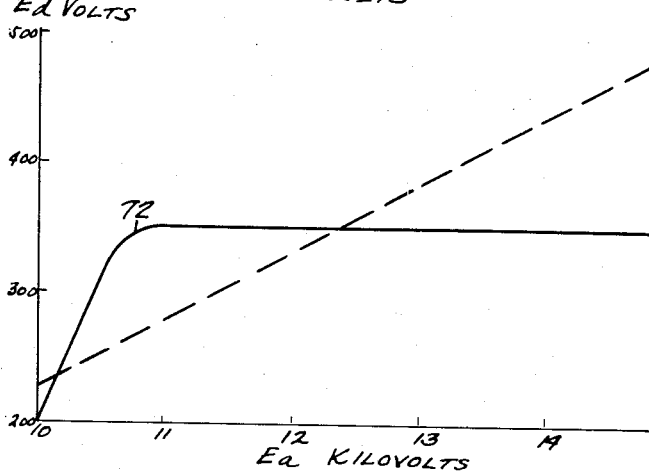
Figure 13 shows the output voltage as a function of the input voltage for the circuit of Figure 1 when adapted with the novel control circuit of Figure 10.

Figure 11 shows the control voltage and control current which are produced by this circuit. Figure 12 shows the variation of the output voltage $E_d$ against the input voltage $E_a$, and Figure 13 shows the same curve with the application of the compounding circuit.

From Figure 12 it is apparent that normally a slight variation of the A.-C. voltage $E_a$ will produce a substantial variation in the output voltage $E_d$. This voltage variation is more than proportional than the voltage variation in the A.-C. system, in a circuit such as that of Figure 1, and is caused by the voltage variation at the secondary of transformer 15 which generates the voltage for the rectifier as well as the same voltage variation affecting the flux reversal transformers 34 through 39 which in turn produce less flux reversal current.

The circuit of Figure 10 compensates for this type of voltage variation by making the flux reversal current increase as the A.-C. voltage decreases and utilizes a constant D.-C. potential arrangement of the type set forth in my copending application Serial No. 524,778, filed July 27, 1955, entitled Constant D.-C. Voltage Output Circuit.

More specifically, Figure 10, which is based on the schematic circuit of Figure 2, comprises an auto-transformer 65 having a first and second winding 66 and 67, and a saturable reactor 68 having one end connected to the junction of windings 66 and 67. The voltage $E_a$ is then connected in series with the saturable reactor 68 and winding 66 and the other ends of winding 67 and saturable reactor 68 are connected to the input of rectifier 70. The output of rectifier 70 is then connected to the control circuit terminals 48 and 49 through the smoothing choke 71.

As can be seen in my copending application Serial No. 524,778, filed July 27, 1955, the voltage $E_b$ appearing across reactor 68 will be constant when rectified regardless of variation in the input A.-C. voltage.

Therefore, the voltage appearing across winding 66 equals $E_a - E_b$ which is the difference between a variable A.-C. voltage and a constant A.-C. voltage, while the voltage in $(E_a - E_b)$ appears across winding 67, in being given by the turns ratio $m$ of transformer 65. The voltage $E_c$ which is impressed across the input of rectifier 70 is, $$E_c = (m+1)E_b - mE_a$$

The above equation results in a curve shown as $E_c$ in Figure 11. The A.-C. voltage rises proportionally with the A.-C. voltage and is shown as the dotted line $E_a$. The constant voltage (when rectified) $E_b$ first rises proportionally to the A.-C. voltage and then, from a certain saturation point on, remains constant. The difference voltage $E_c$, according to the above equation, first rises with $E_a$ and then decreases because it is the difference between a constant voltage minus an increasing variable voltage. Thus, from point 72 on, the voltage $E_c$ which generates the control current $I_c$, decreases to zero at point 73.

This control current $I_c$ applied to the rectifier 50 produces a substantially constant voltage output of the rectifier as shown in Figure 13 because the control current increases rapidly as the A.-C. voltage decreases. The dotted line of Figure 13 shows the control characteristic of the rectifier without compounding for A.-C. voltage decrease, and the solid line with the compounding for A.-C. voltage decrease.

It should be noted that below point 72 the voltage of the rectifier decreases even more rapidly than the natural decrease because of the decrease of the control current $I_c$. At point 73 on the right-hand side of Figure 13 the control range of the rectifier is exhausted and raising the A.-C. voltage beyond this point would further increase the output voltage of the rectifier. As shown in Figure 13, however, it is possible to maintain output voltage even for very large input voltage variations.

It is now obvious to those skilled in the art that if the A.-C. voltage variations are not too large (i.e., less than 30% voltage variation) then there is enough control current range left-over to combine the rise of voltage compounding, and the current compounding by using a combination of the circuits shown in Figure 10 and in Figure 5.

Although I have described preferred embodiments of my novel invention, many variations and modifications will now be obvious to those skilled in the art, and I prefer therefore to be limited not by the specific disclosure herein but only by the appended claims.

I claim:

1. In a rectifier system for energizing a D.-C. load from an A.-C. source; said rectifier system including the series connection of said A.-C. source, a rectifying element, and said D.-C. load; a saturable reactor; said saturable reactor being connected in circuit relation with said rectifier system to control the output voltage of said rectifier system; a compounding circuit for controlling the regulation curve of said rectifier and a D.-C. control winding on said saturable type reactor; said compounding circuit being connected to said D.-C. control winding and including a source of constant D.-C. voltage and a source of D.-C. voltage which varies as a function of the voltage of said A.-C. source; said source of constant D.-C. voltage, said source of D.-C. voltage which varies as a function of the voltage of said A.-C. source, and said D.-C. control winding being connected in a closed series connection; the voltage applied to said D.-C. control winding varying responsive to a variation in said input A.-C. voltage to vary the output voltage of said rectifier to maintain a constant output voltage regardless of variations in input A.-C. voltage.

2. In a rectifier system for energizing a D.-C. load from an A.-C. source; said rectifier system including the series connection of said A.-C. source, a rectifying element, and said D.-C. load; a saturable reactor; said saturable reactor being connected in circuit relation with said rectifier system to control the output voltage of said rectifier system; a compounding circuit for controlling the regulation curve of said rectifier and a D.-C. control winding on said saturable type reactor; said compounding circuit being connected to said D.-C. control winding and including a source of constant D.-C. voltage and a source of D.-C. voltage which varies as a function of rectifier load current; said source of constant D.-C. voltage, said source of D.-C. voltage which varies as a function of D.-C. load current, and said D.-C. control winding being connected in a closed series connection; the voltage applied to said D.-C. control winding responsive to a variation in load current varying the output voltage of said rectifier to thereby alter the normal regulation characteristic of said rectifier system; said rectifier being over-compounded when said source of constant voltage and said source of voltage which varies with load current are connected in aiding relationship and being opposite compounded when said last mentioned voltages are in opposing relationship.

3. In a rectifier system for energizing a D.-C. load from an A.-C. source; said rectifier system including the series connection of said A.-C. source, a rectifying element, and said D.-C. load; a saturable reactor; said saturable reactor being connected in circuit relation with said rectifier system to control the output voltage of said rectifier system; a compounding circuit for controlling the regulation curve of said rectifier and a D.-C. control winding on said saturable type reactor; said compounding circuit being connected to said D.-C. control winding and including a source of constant D.-C. voltage and a source of D.-C. voltage which varies as a function of rectifier load current; said source of constant D.-C. voltage, said source of D.-C. voltage which varies as a function of D.-C. load current, and said D.-C. control winding being connected in a closed series connection; the voltage applied to said D.-C. control winding responsive to a variation in load current varying the output voltage of said rectifier to thereby alter the normal regulation characteristic of said rectifier system; said rectifier being opposite-compounded when said last mentioned voltages are in opposing relationship; said voltage applied to said D.-C. control winding being decreased responsive to an increase in output current to thereby opposite-compound the normal regulation characteristic of said rectifier system; said saturable type reactor being substantially fully saturated at some predetermined value of load current, said opposite-compounding occurring only at load currents greater than said predetermined value.

References Cited in the file of this patent

UNITED STATES PATENTS

| 2,503,880 | Mak | Apr. 11, 1950 |
| 2,733,402 | Bixby | Jan. 31, 1956 |
| 2,790,127 | Hamilton | Apr. 23, 1957 |

FOREIGN PATENTS

| 312,780 | Switzerland | Apr. 14, 1956 |